(12) United States Patent
Yamamoto et al.

(10) Patent No.: US 8,376,864 B2
(45) Date of Patent: Feb. 19, 2013

(54) DAMPER MECHANISM

(75) Inventors: Kozo Yamamoto, Neyagawa (JP);
Keisuke Fujioka, Suita (JP); Tomoki Hada, Neyagawa (JP)

(73) Assignee: EXEDY Corporation, Osaka (JP)

( * ) Notice: Subject to any disclaimer, the term of this patent is extended or adjusted under 35 U.S.C. 154(b) by 253 days.

(21) Appl. No.: 12/710,915

(22) Filed: Feb. 23, 2010

(65) Prior Publication Data

US 2010/0222149 A1 Sep. 2, 2010

(30) Foreign Application Priority Data

Mar. 2, 2009 (JP) ................................ 2009-048504

(51) Int. Cl.
*F16F 15/121* (2006.01)
(52) U.S. Cl. ...................................... 464/68.1
(58) Field of Classification Search ................ 464/64.1, 464/66.1, 68.1, 68.9, 81–83, 85
See application file for complete search history.

(56) References Cited

U.S. PATENT DOCUMENTS

| 380,454 | A | * | 4/1888 | Morgan ..................... 464/82 X |
| 431,124 | A | * | 7/1890 | Rae ........................... 464/64.1 X |
| 1,893,486 | A | * | 1/1933 | Black .......................... 464/66.1 |
| 4,533,338 | A | * | 8/1985 | Hamada ....................... 464/64.1 |
| 5,551,928 | A | | 9/1996 | Sudau |
| 6,019,683 | A | | 2/2000 | Sudau |

FOREIGN PATENT DOCUMENTS

| DE | 341206 | * | 9/1921 | ...................... 464/82 |
| IT | 518613 | * | 12/1956 | ...................... 464/83 |
| JP | 06-62251 | U | | 9/1994 |
| JP | H07-208547 | A | | 8/1995 |
| JP | H09-242825 | A | | 9/1997 |
| JP | 10-47453 | A | | 2/1998 |
| JP | 2005-249037 | A | | 9/2005 |
| WO | WO-2009/018801 | A1 | | 2/2009 |

* cited by examiner

*Primary Examiner* — Gregory Binda
(74) *Attorney, Agent, or Firm* — Global IP Counselors, LLP

(57) ABSTRACT

A damper mechanism has a first rotating body, a second rotating body, at least one first elastic member, and at least one second elastic member. The second rotating body is disposed rotatably with respect to the first rotating body. The first elastic member is disposed so as to link elastically the first rotating body and the second rotating body in the rotation direction, and to operate only on the positive side of the torsional characteristics. The second elastic member is disposed so as to link elastically the first rotating body and the second rotating body in the rotation direction, and operate only on the negative side of the torsional characteristics.

18 Claims, 6 Drawing Sheets

DAMPER MECHANISM

CROSS-REFERENCE TO RELATED APPLICATIONS

This application claims priority to Japanese Patent Application No. 2009-048504 filed on Mar. 2, 2009. The entire disclosure of Japanese Patent Application No. 2009-048504 is hereby incorporated herein by reference.

BACKGROUND OF THE INVENTION

1. Field of the Invention

The present invention generally relates to a damper mechanism. More specifically, the present invention relates to a damper mechanism that damps rotational vibration.

2. Background Information

Various devices are included in the drive system of a vehicle in order to transmit power generated by the engine. Examples of such devices include clutch devices and flywheel assemblies. These devices make use of a damper mechanism for the purpose of damping rotational vibration (see, for example, Japanese Laid-Open Patent Application H7-208547 and Japanese Laid-Open Patent Application H9-242825).

This type of damper mechanism has springs or other such elastic members. Rotational vibration is absorbed or damped by the elastic members.

However, while the damper mechanism is operating, the elastic members repeatedly expand and contract on the positive and negative side of the torsional characteristics, so the expansion and contraction frequency of the elastic members is high, and this can lead to impaired durability in the damper mechanism.

In view of the above, it will be apparent to those skilled in the art from this disclosure that there exists a need for an improved damper mechanism. This invention addresses this need in the art as well as other needs, which will become apparent to those skilled in the art from this disclosure.

SUMMARY OF THE INVENTION

It is one object of the present invention to improve the durability of a damper mechanism.

A damper mechanism according to one aspect has a first rotating body, a second rotating body, at least one first elastic member, and at least one second elastic member. The second rotating body is disposed rotatably with respect to the first rotating body. The first elastic member is disposed so as to link the first rotating body and the second rotating body elastically in a circumferential direction, and operates only on the positive side of torsional characteristics. The second elastic member is disposed so as to link the first rotating body and the second rotating body elastically in the circumferential direction, and operates only on the negative side of torsional characteristics.

With this damper mechanism, the first elastic member operates only on the positive side of the torsional characteristics, and the second elastic member operates only on the negative side of the torsional characteristics. In other words, the second elastic member does not operate on the positive side of the torsional characteristics, and the first elastic member does not operation on the negative side of the torsional characteristics.

Consequently, with this damper mechanism, the frequency of operation of the first elastic member and second elastic member can be reduced, and this improves durability.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overall Constitution

Figure 1:
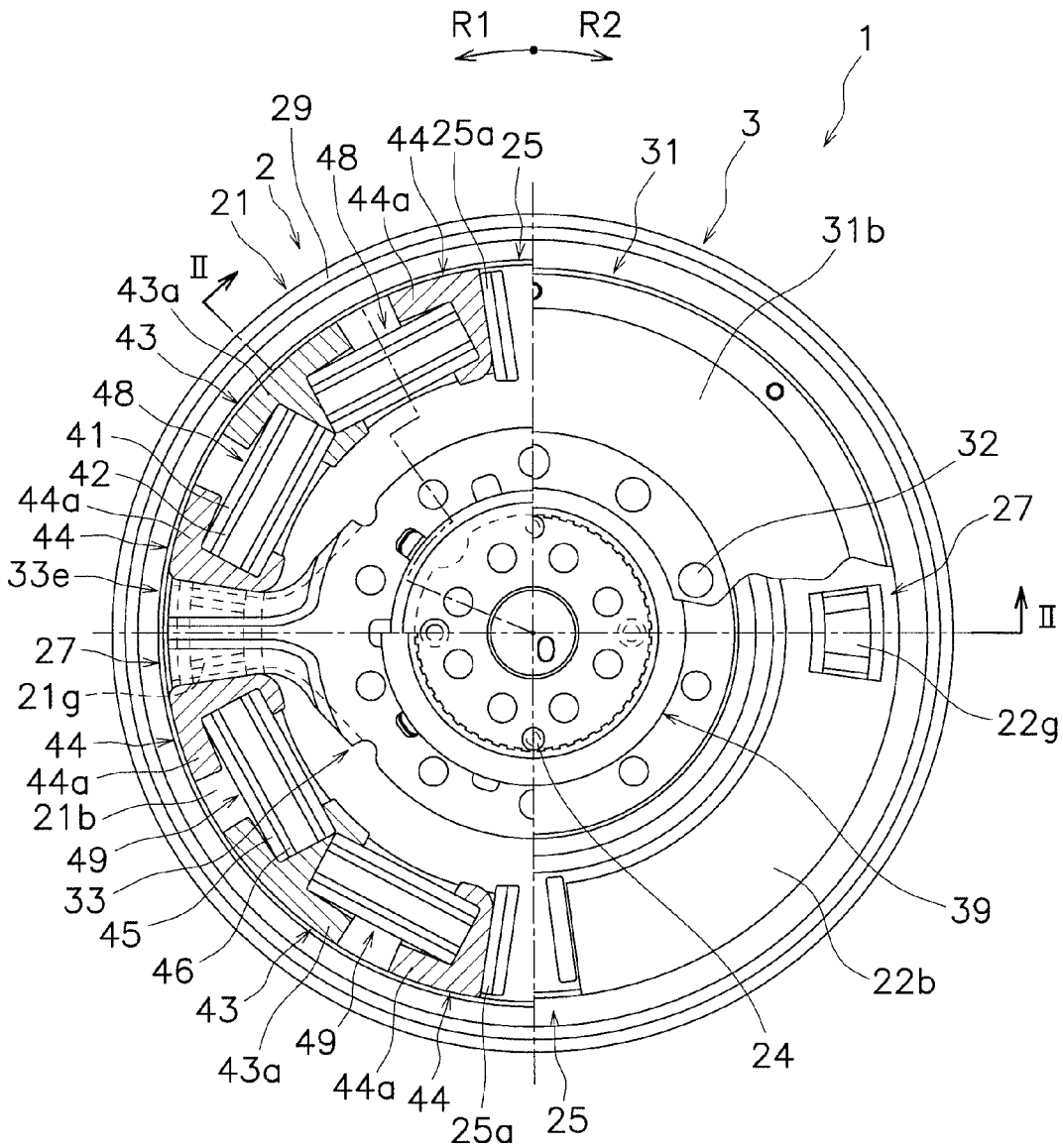
FIG. 1 is an elevational view with sections removed for illustrative purposes of a flywheel assembly in accordance with an embodiment of the present invention.

A flywheel assembly 1 will be described with reference to FIGS. 1 to 4. An engine (not shown) is disposed on the left side in FIGS. 2, 4, and 5, and a transmission (not shown) is disposed on the right side. Herein, the left side in FIGS. 2, 4, and 5 will be referred to as the engine side, and the right side as the transmission side. Also, as shown in FIG. 1, which shows a transmission side of the flywheel assembly 1, the counter-clockwise direction will be called the first rotation direction R1, and the clockwise direction will be called the second rotation direction R2. The flywheel assembly 1 is rotationally driven in the first rotation direction R1 by or via the first flywheel 2.

Figure 2:
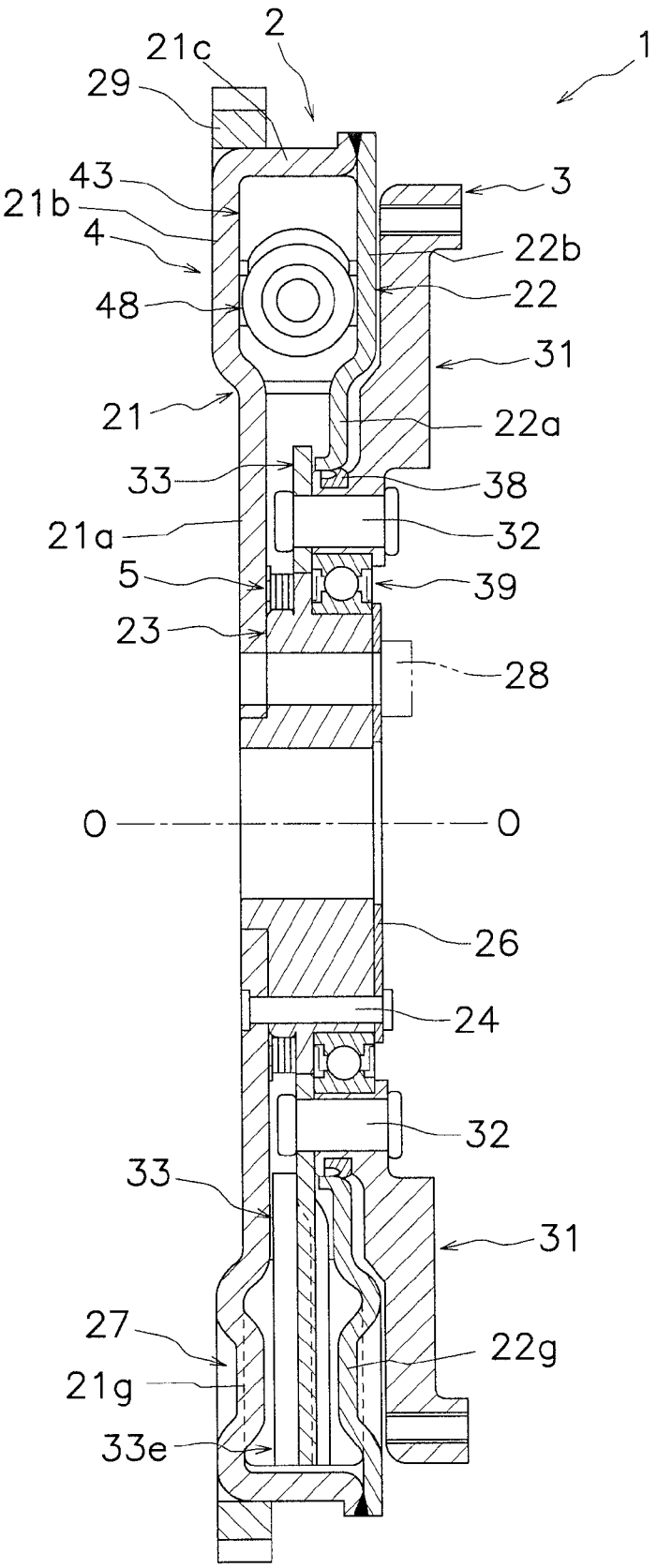
FIG. 2 is a cross-sectional view of the flywheel assembly taken along the II-II line in FIG. 1.

As shown in FIGS. 1 and 2, the flywheel assembly 1 is an apparatus for transmitting power generated by an engine to a transmission via a clutch device (not shown). The flywheel assembly 1 has the first flywheel 2 (an example of the first rotating body), a second flywheel 3 (an example of the second rotating body), a damper mechanism 4, and a friction generating mechanism 5. The first flywheel 2 functions as an input member of the damper mechanism 4, while the second flywheel 3 functions as an output member of the damper mechanism 4, so the first flywheel 2 and the second flywheel 3 can also be considered to be part of the damper mechanism 4.

First Flywheel

The first flywheel 2 is a member to which power generated by the engine is inputted, and is fixed to a crankshaft (not shown) of the engine by bolts 28. The first flywheel 2 has a first plate 21, a second plate 22, a support member 23, a hold-down plate 26, two first support portions 25, and two second support portions 27. A ring gear 29 is welded to the outer peripheral part of the first flywheel 2. It should be apparent from this disclosure that an inertia member can be attached to the first flywheel 2.

The first plate 21 has a first plate main body 21a, two first side portions 21b, a cylindrical portion 21c that extends in the axial direction from the outer peripheral part of the first plate main body 21a and the first side portions 21b, and two first contact portions 21g (an example of the first portions).

Figure 4:
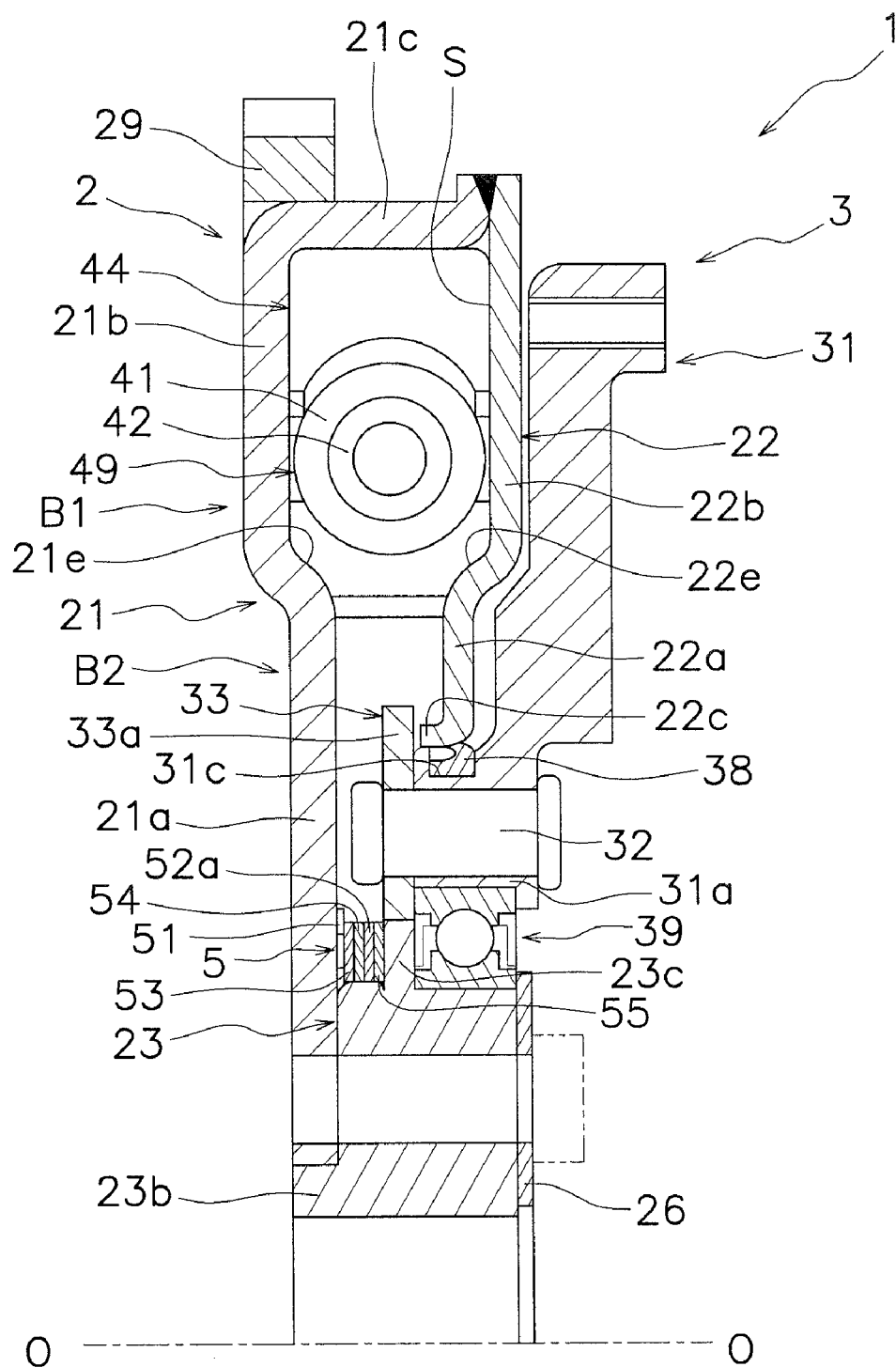
FIG. 4 is a partial cross-sectional view of the flywheel assembly.
Figure 5:
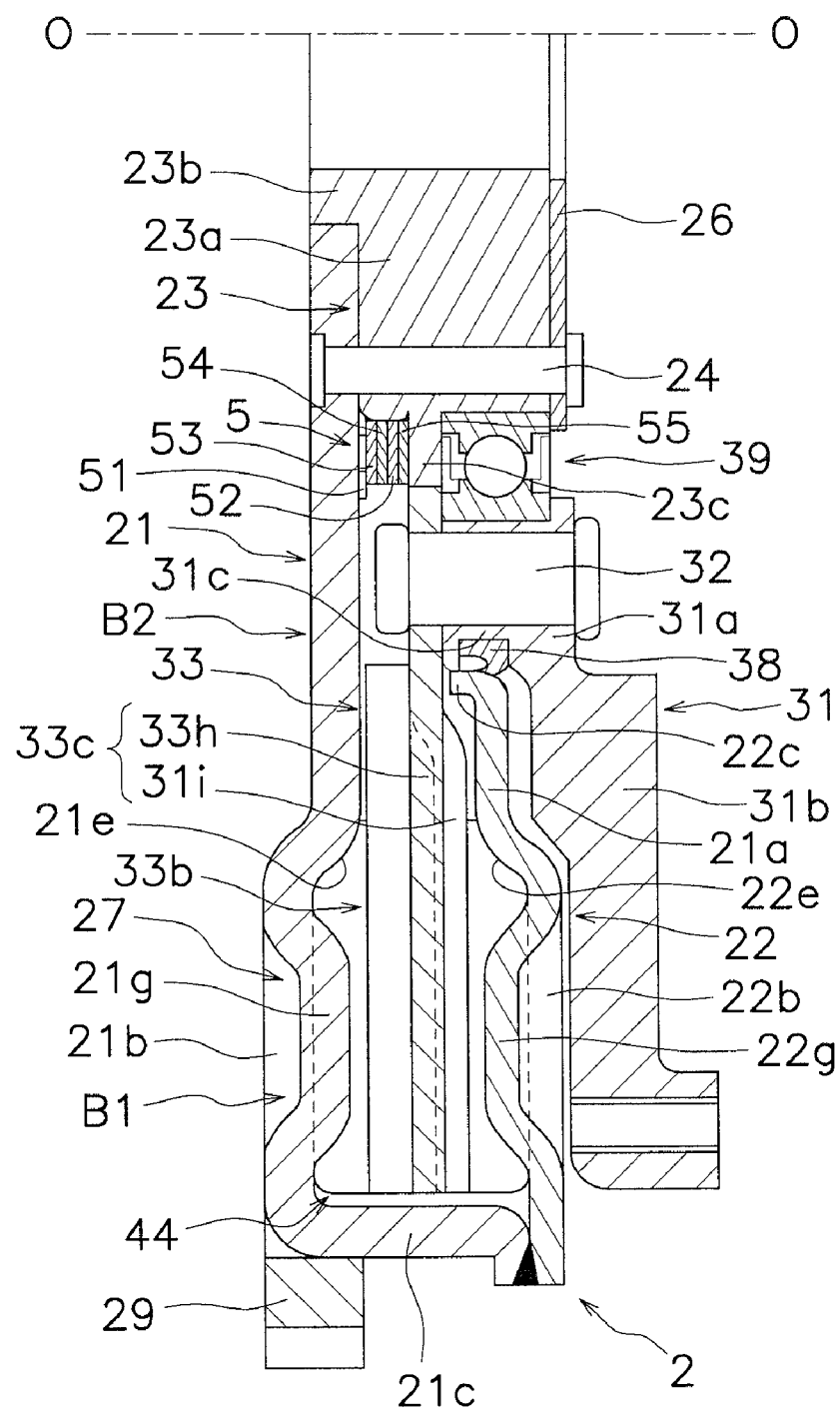
FIG. 5 is another partial cross-sectional view of the flywheel assembly.

Referring now to FIGS. 1, 4, and 5, the first side portions 21b are portions located more to the engine side than the first plate main body 21a, and can be formed by stamping, for example. The two first side portions 21b are disposed at an equal pitch in a circumferential direction. The first side portions 21b are formed within a range corresponding to two first spring sets 48 and two second spring sets 49 (discussed below). An inclined face 21e that is inclined with respect to the axial direction is formed on the inner peripheral part of each of the first side portions 21b. Each inclined face 21e inclines toward the engine side from an inner radial portion to an outer radial portion. The inclined faces 21e are able to slide against first spring seats 44 (discussed below) and second spring seats 43 (discussed below).

The first contact portions 21g are portions for supporting the ends of the first spring sets 48 and the second spring sets 49, and protrude from the first side portions 21b to the transmission side. The first contact portions 21g are formed integrally, and can be formed as a one piece unitary member with the first side portions 21b (first holder B1). The first contact portions 21g are able to come into contact with the first spring seats 44 in the circumferential direction, and are disposed near the approximate center of the first side portions 21b in the circumferential direction. The first contact portions 21g are disposed between the first spring sets 48 and the second spring sets 49 (more specifically, between the first spring seats 44), and form the second support portions 27 along with second contact portions 22g (discussed below) of the second plate 22.

The second plate 22 is an annular member that is fixed to the cylindrical portion 21c, and has a second plate main body 22a, two second side portions 22b, an inner cylindrical portion 22c, and the two second contact portions 22g (an example of the second portions). The second side portions 22b are portions located more to the transmission side than the second plate main body 22a, and can be formed by stamping, for example. The two second side portions 22b are disposed at an equal pitch in the circumferential direction. The second side portions 22b are formed within a range corresponding to the two first spring sets 48 and the two second spring sets 49 (discussed below). An inclined face 22e that is inclined with respect to the axial direction is formed on the inner peripheral part of each of the second side portions 22b. The inclined faces 22e are paired with the inclined faces 21e, and are able to slide against the first spring seats 44 (discussed below) and the second spring seats 43 (discussed below). The inclined faces 22e incline toward the transmission side from an inner radial portion to an outer radial portion.

The second contact portions 22g are portions for supporting the ends of the first spring sets 48 and the second spring sets 49, and protrude from the second side portions 22b to the engine side. The second contact portions 22g are formed integrally, and can be formed as a one piece unitary member, with the second side portions 22b (first holder B1). The second contact portions 22g are able to come into contact with the first spring seats 44 in the circumferential direction, and are disposed near the approximate center of the second side portions 22b. The second contact portions 22g are disposed opposite the first contact portions 21g in the axial direction, and are disposed spaced apart from the first contact portions 21g in the axial direction. The first contact portions 21g are disposed between the first spring sets 48 and the second spring sets 49 (more specifically, between the first spring seats 44), and form the second support portions 27 along with first contact portions 21g of the first plate 21.

Since the second side portions 22b are disposed opposite the first side portions 21b in the axial direction, relatively large spaces in which the first spring sets 48 and the second spring sets 49 are disposed can be formed on the outer peripheral part of the first flywheel 2 by the first side portions 21b and the second side portions 22b.

The inner cylindrical portion 22c is an annular portion that extends from the inner peripheral part of the second plate main body 22a to the engine side, and is in contact with a seal ring 38 (discussed below).

The support member 23 has an annular support member main body 23a, an annular protrusion 23b, and an annular sliding portion 23c. Referring to FIGS. 2 and 5, the support member main body 23a is fixed along with the first plate 21 to the crankshaft by the bolts 28. The annular protrusion 23b is an annular portion that protrudes from the inner peripheral part of the support member main body 23a to the engine side, and positions the first plate 21 in the radial direction. The sliding portion 23c is a portion that extends in the radial direction from the support member main body 23a, and slides against a second friction plate 55 of the friction generating mechanism 5. A bearing 39 is fitted to the outer peripheral part of the support member main body 23a.

The hold-down plate 26 is a member for holding down the bearing 39 in the axial direction, and is fixed to the crankshaft by the bolts 28 along with the first plate 21 and the support member 23. The hold-down plate 26 is also fixed to the first plate 21 and the support member 23 by rivets 24. The hold-down plate 26 can be arranged to contact the bearing 39 on an axial transmission side of the bearing 39.

Figure 3:
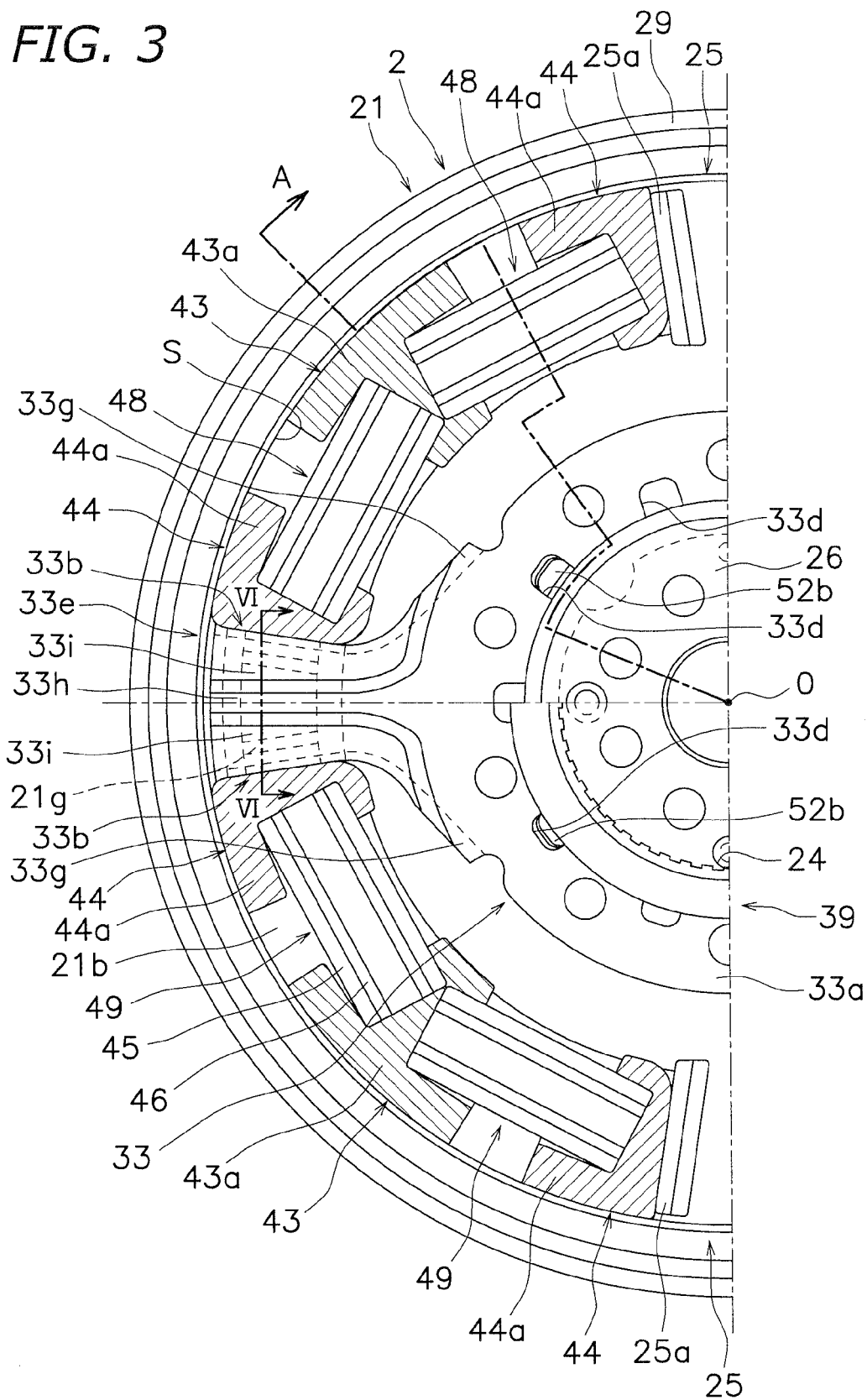
FIG. 3 is a partial elevational view of the flywheel assembly.

As seen in FIGS. 1 and 3, the first support portions 25 are portions for supporting the first spring sets 48 and the second spring sets 49 in the circumferential direction, and have a pair of support plates 25a. The support plates 25a are fixed to the first plate 21 and the second plate 22, and are able to come into contact with the first spring seats 44 in the circumferential direction.

The two first support portions 25 are disposed spaced apart in the circumferential direction, and are disposed at locations that are opposite each other with respect to the rotational axis O. The two second support portions 27 are disposed spaced apart in the circumferential direction, and are disposed at locations that are opposite each other with respect to the rotational axis O. The second support portions 27 are disposed between adjacent first support portions 25 (more specifically, near the center of adjacent first support portions 25).

Each of the two first spring sets 48 is disposed on a first rotation direction R1 side of the first support portion 25 and a second rotation direction R2 side of the corresponding second support portion 27 between the first support portions 25 in a circumferential direction. Further, these two first spring sets 48 are supported in the circumferential direction by the first support portions 25 and the second support portions 27.

Each of the two second spring sets 49 is disposed on a second rotation direction R2 side of the first support portion 25 and a first rotation direction R1 side of the corresponding second support portion 27 between the first support portions 25 in a circumferential direction. Further, these two first spring sets 48 are supported in the circumferential direction by the first support portions 25 and the second support portions 27.

Second Flywheel

Referring to FIGS. 1, 4, and 5, the second flywheel 3 is a member disposed rotatably with respect to the first flywheel 2, and has a second flywheel main body 31 and an output plate 33. The second flywheel 3 is supported rotatably with respect to the first flywheel 2 by the bearing 39.

The second flywheel main body 31 is an annular member disposed on the transmission side of the second plate 22, and has a support portion 31a and a friction portion 31b.

The support portion 31a is an annular portion supported rotatably with respect to the first flywheel 2 by the bearing 39, and is disposed on the inner peripheral side of the first flywheel 2. The seal ring 38 is fitted in a groove 31c in the support portion 31a. The seal ring 38 seals the external space of the first flywheel 2 and the holding space S of the first flywheel 2. The holding space S is filled with lubricating fluid. The output plate 33 is fixed to the support portion 31a by rivets 32.

The friction portion 31b is an annular portion against which is pressed a friction facing of a clutch disk assembly (not shown), and is provided on the outer peripheral part of the support portion 31a. The friction portion 31b is disposed on the transmission side of the second plate 22, and is closer to the transmission side than the support portion 31a.

The output plate 33 is disposed in the holding space S, and is fixed to the support portion 31a. The output plate 33 has an annular main body portion 33a and two transmission portions 33e that extend in the radial direction from the main body portion 33a.

The main body portion 33a is an annular portion that is fixed to the support portion 31a. As seen in FIG. 3, a plurality of cut-outs 33d disposed at an equal pitch in the circumferential direction is formed on the inner peripheral part of the main body portion 33a. Protrusions 52b of a second bushing 52 (discussed below) are inserted into the cut-outs 33d. This makes it possible for the second bushing 52 and the second flywheel 3 to rotate integrally.

Figure 6:
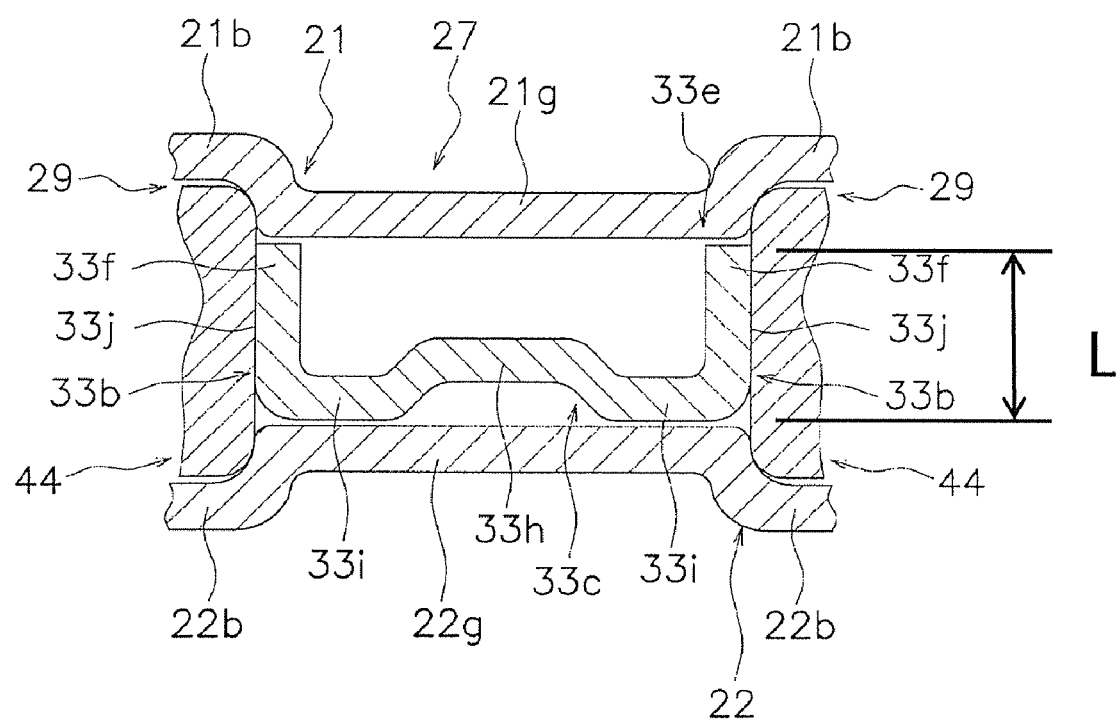
FIG. 6 is a cross-sectional view taken along the VI-VI line in FIG. 3.

Referring to FIGS. 1, 2, and 6, each of the transmission portions 33e is a portion to which the power transmitted to the first flywheel 2 is transmitted via the first spring sets 48 and the second spring sets 49, and is disposed between the first contact portions 21g and the second contact portions 22g in the axial direction in a state in which power is not being inputted to the damper mechanism 4, in other words, in a neutral state. Each of the transmission portions 33e has a first protrusion 33c and a pair of second protrusions 33b. The first protrusion 33c and the second protrusions 33b can be formed by stamping, for example.

As seen in FIGS. 4, 5, and 6, the first protrusion 33c is a flat portion that protrudes outward in the radial direction from the main body portion 33a. The first protrusion 33c has a center portion 33h disposed at the same axial direction position as the main body portion 33a, and a pair of outer portions 33i formed so as to be closer to the transmission side in the axial direction than the center portion 33h. The pair of outer portions 33i are disposed on both sides of the center portion 33h in the circumferential direction.

Referring now to FIGS. 3 and 6, the second protrusions 33b are portions that extend to the engine side in the axial direction from the end of the first protrusion 33c (more specifically, the outer portions 33i) in the circumferential direction, and have contact portions 33f and reinforcing portions 33g. The contact portions 33f are portions extending in the radial direction, and have contact faces 33j that are able to come into contact with the first spring seats 44 (discussed below) in the circumferential direction. The thickness direction of the contact portions 33f (the parabolic direction of the contact faces 33j) substantially coincides with the circumferential direction. The reinforcing portions 33g are portions that link the radial inner ends of the contact portions 33f with the outer peripheral part of the main body portion 33a, and extend from the radial inner ends of the contact portions 33f to the side opposite the contact faces 33j. As shown in FIG. 3, the reinforcing portions 33g have a curved portion. The size of the reinforcing portions 33g in the axial direction is the same as the axial size of the contact portions 33f. Since the outer portions 33i are located closer to the transmission side than the center portion 33h, the axial size L of the contact portions 33f can be relatively large. This allows the surface area of the contact faces 33j to be set larger.

Damper Mechanism

Referring to FIGS. 1, 2, and 4, the damper mechanism 4 is a mechanism that elastically links the first flywheel 2 and the second flywheel 3 in the circumferential direction, and, in this embodiment, has four first spring sets 48 (an example of the first elastic member), four second spring sets 49 (an example of the second elastic member), eight first spring seats 44, and four second spring seats 43. The damper mechanism 4 also includes the above-mentioned first plate 21, the second plate 22, and the output plate 33.

The first spring sets 48 are disposed so as to link elastically the first flywheel 2 and the second flywheel 3 in the circumferential direction, and are compressed only on the positive side of the torsional characteristics. More specifically, the first spring sets 48 each have a first spring 41 and a second spring 42. The second springs 42 are disposed so as to act in parallel on the inside of the first springs 41. Two first spring sets 48 are disposed in a pre-compressed state so as to act in series in the first holder B1 formed by the first side portions 21b, the second side portions 22b, and the cylindrical portion 21c. In this state, two first spring seats 44 come into contact with the first support portions 25 and the second support portions 27, respectively. That is, two first spring sets 48 are supported in the circumferential direction between the first support portions 25 and the second support portions 27.

The second spring sets 49 are disposed so as to link elastically the first flywheel 2 and the second flywheel 3 in the circumferential direction, and are compressed only on the negative side of the torsional characteristics. More specifically, the second spring sets 49 each have a third spring 45 and a fourth spring 46. The fourth springs 46 are disposed so as to act in parallel on the inside of the third springs 45. Two second spring sets 49 are disposed so as to act in series in a pre-compressed state in the first holder B1 formed by the first side portions 21b, the second side portions 22b, and the cylindrical portion 21c. In this state, two first spring seats 44 come into contact with the first support portions 25 and the second support portions 27, respectively. That is, two second spring sets 49 are supported in the circumferential direction between the first support portions 25 and the second support portions 27.

In this embodiment, the first spring sets 48 and the second spring sets 49 are springs with the same specifications, and are supported at the ends by the first spring seats 44 and the second spring seats 43. The second spring seats 43 are disposed between the first spring sets 48. The second spring seats 43 are also disposed between the second spring sets 49.

As seen in FIG. 3, the first spring sets 48, the first spring seats 44, and the second spring seats 43 are held in the holding space S of the first flywheel 2. More specifically, referring to FIGS. 3 and 4, the first spring sets 48, the first spring seats 44, and the second spring seats 43 are disposed in the first holder B1 formed by the first side portions 21b, the cylindrical portion 21c, and the second side portions 22b. The pair of inclined faces 21e are formed on a second holder B2 that is more constricted in the axial direction than the first holder B1. Accordingly, the first spring seats 44 and the second spring seats 43 are able to move in the circumferential direction inside the first holder B1 in a state in which movement in the axial direction and the radial direction is restricted with respect to the first flywheel 2.

The second spring sets 49, the first spring seats 44, and the second spring seats 43 are held in the holding space S of the first flywheel 2, just as with the first spring sets 48. More specifically, the second spring sets 49, the first spring seats 44, and the second spring seats 43 are disposed in the first holder B1 formed by the first side portions 21b, the cylindrical portion 21c, and the second side portions 22b. The pair of inclined faces 21e are formed on the second holder B2, which is more constricted in the axial direction than the first holder B1. Accordingly, the first spring seats 44 and the second spring seats 43 are able to move in the circumferential direction inside the first holder B1 in a state in which movement in the axial direction and the radial direction is restricted with respect to the first flywheel 2.

Friction Generating Mechanism

As seen in FIGS. 3, 4, and 5, the friction generating mechanism 5 is a mechanism for generating resistance in the circumferential direction between the first flywheel 2 and the second flywheel 3, and has a first bushing 53, the second bushing 52, a first friction plate 54, the second friction plate 55, and a cone spring 51.

The first bushing 53 is disposed so as to be able to rotate integrally with the second flywheel 3, and is disposed on the engine side of the first friction plate 54.

The second bushing 52 is disposed so as to be able to rotate integrally with the first flywheel 2, and has an annular first bushing main body 52a (an example of the first member main body), and a plurality of protrusions 52b that protrude outward in the radial direction from the first bushing main body 52a. The first bushing main body 52a is disposed in the axial direction between the first friction plate 54 and the second friction plate 55, and is able to slide against the first friction plate 54 and the second friction plate 55. The protrusions 52b are inserted into the above-mentioned cut-outs 33d.

The first friction plate 54 is sandwiched in the axial direction between the first bushing 53 and the second bushing 52, and is disposed so as to be able to rotate with respect to the first flywheel 2 and the second flywheel 3. The second friction plate 55 is sandwiched in the axial direction between the second bushing 52 and the sliding portion 23c, and is disposed so as to be able to rotate with respect to the second bushing 52 and the first flywheel 2. The cone spring 51 is disposed in the axial direction between the first bushing 53 and the first plate 21, and presses the first bushing 53 toward the transmission side.

Operation (1) Positive Side of Torsional Characteristics

Referring to FIGS. 1 and 2, when the clutch disk assembly is pressed against the second flywheel 3, power is transmitted from the engine to the transmission via the flywheel assembly 1 and the clutch disk assembly. More specifically, the first flywheel 2 begins to rotate in the first rotation direction R1 with respect to the second flywheel 3. As a result, the compression of the first spring sets 48 between the first flywheel 2 and the second flywheel 3 begins. More precisely, the first spring sets 48 are compressed in the circumferential direction between the first support portions 25 of the first flywheel 2 and the transmission portions 33e of the second flywheel 3. Since the ends of the first spring sets 48 are covered by the first spring seats 44 and the second spring seats 43 at this point, the ends of the first spring sets 48 are prevented from sliding against the first flywheel 2.

Referring now to FIGS. 1, 4, and 5, when the first flywheel 2 rotates in the first rotation direction R1 with respect to the second flywheel 3, frictional resistance is generated in the friction generating mechanism 5. More specifically, since the second bushing 52 rotates with respect to the first bushing 53, the first friction plate 54 slides against the first bushing 53 or the second bushing 52. Also, since the sliding portion 23c of the support member 23 rotates with respect to the second bushing 52, the second friction plate 55 slides against the second bushing 52 or the sliding portion 23c. Therefore, resistance (that is, hysteresis torque) is generated in the circumferential direction between the first flywheel 2 and the second flywheel 3.

As rotation of the first flywheel 2 proceeds with respect to the second flywheel 3, first outer support portions 44a of the first spring seats 44 and second outer support portions 43a of the second spring seats 43 come into contact in the circumferential direction. As a result, the first spring seats 44 and the second spring seats 43 are sandwiched between the transmission portions 33e and the first support portions 25 of the first flywheel 2 in the circumferential direction, and relative rotation of the first flywheel 2 and the second flywheel 3 comes to a halt. Consequently, power is transmitted from the first flywheel 2 to the second flywheel 3 via the first spring seats 44 and the second spring seats 43.

Since at this point the second spring sets 49 are supported in the circumferential direction by the second support portions 27 and the first support portions 25, the second spring sets 49 are not compressed only when the first flywheel 2 rotates in the first rotating direction R1 with respect to rotation of the second flywheel 2, and only the first spring sets 48 are compressed in the circumferential direction of the first flywheel 2 and the second flywheel 3.

(2) Negative Side of Torsional Characteristics

Meanwhile, when engine braking is used, for example, the first flywheel 2 begins to rotate in the second rotation direction R2 with respect to the second flywheel 3. As a result, the second spring sets 49 begin to be compressed between the first flywheel 2 and the second flywheel 3. More precisely, the second spring sets 49 are compressed in the circumferential direction between the transmission portions 33e of the second flywheel 3 and the first support portions 25 of the first flywheel 2. Since at this point the ends of the second spring sets 49 are covered by the first spring seats 44 and the second spring seats 43, the ends of the second spring sets 49 can be prevented from sliding against the first flywheel 2.

Also, when the first flywheel 2 rotates in the second rotation direction R2 with respect to the second flywheel 3, frictional resistance is generated in the friction generating mechanism 5. More specifically, since the second bushing 52 rotates with respect to the first bushing 53, the first friction plate 54 slides against the first bushing 53 or the second bushing 52. Also, since the sliding portion 23c of the support member 23 rotates with respect to the second bushing 52, the second friction plate 55 slides against the second bushing 52 or the sliding portion 23c. Therefore, resistance (that is, hysteresis torque) is generated in the circumferential direction between the first flywheel 2 and the second flywheel 3.

As rotation of the first flywheel 2 proceeds with respect to the second flywheel 3, the first outer support portions 44a of the first spring seats 44 and the second outer support portions 43a of the second spring seats 43 come into contact in the circumferential direction. As a result, the first spring seats 44 and the second spring seats 43 are sandwiched between the transmission portions 33e and the first support portions 25 of the first flywheel 2 in the circumferential direction, and relative rotation of the first flywheel 2 and the second flywheel 3 comes to a halt. Consequently, power is transmitted from the first flywheel 2 to the second flywheel 3 via the first spring seats 44 and the second spring seats 43.

Since at this point the first spring sets 48 are supported in the circumferential direction by the second support portions 27 and the first support portions 25, the first spring sets 48 are not compressed when the first flywheel 2 rotates in the second rotating direction R2, which is opposite to R1, with respect to rotation of the second flywheel 3, and only the second spring sets 49 are compressed in the circumferential direction of the first flywheel 2 and the second flywheel 3.

Features

Some features of the flywheel assembly 1 described above are described below.

(1) With this flywheel assembly 1, the first spring sets 48 are compressed only on the positive side of the torsional characteristics, and the second spring sets 49 are compressed only on the negative side of the torsional characteristics. That is, the second spring sets 49 do not act on the positive side of the torsional characteristics, and the first spring sets 48 do not act on the negative side of the torsional characteristics. Consequently, the frequency of operation of the first spring sets 48 and the second spring sets 49 can be reduced, and durability can be improved.

(2) With this flywheel assembly 1, since the first spring sets 48 are supported in the circumferential direction by the first support portions 25 and the second support portions 27, offset of the first spring sets 48 in the circumferential direction can be prevented when the first spring sets 48 are not operating. Consequently, loss of the rotational balance of the flywheel assembly 1 can be prevented, and vibration caused by offset of the first spring sets 48 can be prevented from being generated by the flywheel assembly 1. Also, the first spring sets 48 can be prevented from falling out of the first spring seats 44.

Also, since the second spring sets 49 are supported in the circumferential direction by the first support portions 25 and the second support portions 27, noise caused by offset of the second spring sets 49 in the circumferential direction can be prevented from occurring when the second spring sets 49 are not operating. Also, the second spring sets 49 can be prevented from falling out of the second spring sheets 43.

(3) With this flywheel assembly 1, the first contact portions 21g are part of the first plate 21, and the second contact portions 22g are part of the second plate 22. More precisely, the first contact portions 21g are formed integrally with the first side portions 21b, and the second contact portions 22g are formed integrally with the second side portions 22b. Therefore, the second support portions 27 can be obtained with a simple configuration.

(4) With this flywheel assembly 1, since the transmission portions 33e are disposed between the first contact portions 21g and the second contact portions 22g in the circumferential direction in a state in which no power is inputted to the first flywheel 2 and the second flywheel 3, the transmission portions 33e can come into contact with the approximate center of the first spring sets 48 and the second spring sets 49 (more precisely, near the approximate center of the first spring seats 44). Consequently, power transmission between the transmission portions 33e and the first spring sets 48, and power transmission between the transmission portions 33e and the second spring sets 49 can be carried out smoothly.

(5) With this flywheel assembly 1, the first contact portions 21g and the second contact portions 22g are formed integrally with the first holder B1, and protrude from the first holder B1 so as to be near each other. Therefore, the second support portions 27 can be obtained with a simple configuration.

Other Embodiments

The present invention is not limited to or by the above embodiments, and various modifications and revisions are possible without departing from the scope of the invention.

(1) In the above embodiment, two first spring sets 48 are disposed in series, but at least one first spring set 48 may be disposed between the first support portions 25 and the second support portions 27.

Also, two second spring sets 49 are disposed in series, but at least one second spring set 49 may be disposed between the first support portions 25 and the second support portions 27.

(2) In the above embodiment, two first support portions 25 and two second support portions 27 are provided, but the number of first support portions 25 and second support portions 27 is not limited to what is given in the above embodiments. For instance, there may only be one first support portion 25 and one second support portion 27, or there may be three or more of each.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a flywheel assembly equipped with the present invention. Accordingly, these terms, as utilized to describe the present invention should be interpreted relative to a flywheel assembly equipped with the present invention as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A damper mechanism, comprising:
a first rotating body;
a second rotating body disposed rotatably with respect to the first rotating body, the first rotating body and the second rotation body being configured and arranged in an axial direction;
at least one first elastic member disposed to link the first rotating body and the second rotating body elastically in a circumferential rotation direction, the first elastic member operating only when the first rotating body rotates in a first rotating direction with respect to rotation of the second rotating body; and at least one second elastic member disposed to link the first rotating body and the second rotating body elastically in the circumferential direction, the second elastic member operating only when the first rotating body rotates in a second rotating direction with respect to the rotation of the second rotating body, the second rotating direction being opposite to the first rotating direction, the first and second elastic member being configured and arranged in a circumferential direction, the first rotating body having at least one first support portion, and at least one second support portion that is disposed apart from the first support portion in the circumferential direction, the second rotating body having at least one transmission portion, the first elastic member being supported in the circumferential direction by the first support portion and the second support portion, and being compressed in the circumferential direction between the first support portion and the transmission portion only when the first rotating body rotates in the first rotating direction with respect to the rotation of the second rotating body, the second elastic member being supported in the circumferential direction by the first support portion and the second support portion, and being compressed in the circumferential direction between the first support portion and the transmission portion only when the first rotating body rotates in the second rotating direction with respect to the second rotating body.

2. The damper mechanism according to claim 1, wherein the second support portion has a first portion that is disposed between the first elastic member and the second elastic member and is contactable with the first elastic member and the second elastic member in the circumferential direction, and a second portion that is disposed apart from the first portion in the axial direction and is contactable with the first elastic member and the second elastic member in the circumferential direction.

3. The damper mechanism according to claim 2, wherein the transmission portion is disposed in the axial direction between the first portion and the second portion in a neutral state.

4. The damper mechanism according to claim 3, wherein the first rotating body further has a holder to hold the first elastic member and the second elastic member in a way in which the first elastic member and the second elastic member are elastically deformable in the circumferential direction, and the first portion and the second portion are molded integrally with the holder and protrude so as to approach each other from the holder.

5. The damper mechanism according to claim 3, wherein the transmission portion has a first protrusion and two second protrusions that protrude in an axial direction.

6. The damper mechanism according to claim 5, wherein the first protrusion has a center portion and a pair of outer portions disposed on opposite sides of the center portion, and the outer portions connect the second protrusions to the first protrusion.

7. The damper mechanism according to claim 2, wherein the first rotating body further has a holder to hold the first elastic member and the second elastic member to be elastically deformable in the circumferential direction, and the first portion and the second portion are molded integrally with the holder and protrude so as to approach each other from the holder.

8. The damper mechanism according to claim 7, wherein the first rotating body has a first plate and a second plate, the first and second plates being arranged on axial opposite sides of the first and second elastic members to form the holder and the first and second portions.

9. The damper mechanism according to claim 8, wherein the transmission portion is arranged axially between the first and second plates.

10. The damper mechanism according to claim 9, wherein the second plate is arranged axially between the first and second elastic members and a main body of the second rotating body.

11. The damper mechanism according to claim 10, wherein the main body has a support portion that supports an radially inner periphery of the second plate.

12. The damper mechanism according to claim 11, further comprising a seal ring arranged between the support portion and second plate.

13. The damper mechanism according to claim 12, wherein the seal ring is arranged in a groove of support portion.

14. The damper mechanism according to claim 2, further comprising a friction generating mechanism axially arranged between the first and second rotating bodies.

15. The damper mechanism according to claim 14, wherein the transmission portion has a first protrusion and two second protrusions that protrude in an axial direction.

16. The damper mechanism according to claim 15, wherein the first protrusion has a center portion and a pair of outer portions disposed on opposite sides of the center portion, and the outer portions connect the second protrusions to the first protrusion.

17. The damper mechanism according to claim 2, wherein the transmission portion has a first protrusion and two second protrusions that protrude in an axial direction.

18. The damper mechanism according to claim 17, wherein the first protrusion has a center portion and a pair of outer portions disposed on opposite sides of the center portion, and the outer portions connect the second protrusions to the first protrusion.

* * * * *